United States Patent [19]

Ishihara

[11] Patent Number: 5,673,372

[45] Date of Patent: Sep. 30, 1997

[54] PRINTING COLOR DISPLAY DEVICE FOR A PRINTER

[75] Inventor: Nobuyoshi Ishihara, Tokyo, Japan

[73] Assignee: Citizen Watch Co., Ltd., Tokyo, Japan

[21] Appl. No.: 776,373

[22] PCT Filed: Feb. 22, 1991

[86] PCT No.: PCT/JP91/00232

§ 371 Date: Nov. 27, 1991

§ 102(e) Date: Nov. 27, 1991

[87] PCT Pub. No.: WO91/12969

PCT Pub. Date: Sep. 5, 1991

[30] Foreign Application Priority Data

Feb. 23, 1990 [JP] Japan ......................... 2-41095

[51] Int. Cl.$^6$ .................................................. G06F 15/00
[52] U.S. Cl. ........................... 395/114; 395/101; 395/107; 395/112
[58] Field of Search ..................... 395/104, 109, 395/131, 101–117

[56] References Cited

U.S. PATENT DOCUMENTS

| | | | |
|---|---|---|---|
| 4,280,767 | 7/1981 | Heath | 400/216.2 |
| 4,543,002 | 9/1985 | Bittner et al. | 400/212 |
| 4,707,159 | 11/1987 | Hirano et al. | 400/639.1 |
| 4,846,597 | 7/1989 | Bryant et al. | 400/472 |

FOREIGN PATENT DOCUMENTS

| | | |
|---|---|---|
| 59-120488 | 12/1984 | Japan . |
| 61-005971 | 11/1986 | Japan . |
| 62-207063 | 11/1987 | Japan . |
| 3202379 | 4/1991 | Japan . |

Primary Examiner—Kee M. Tung
Assistant Examiner—U. Chauhan
Attorney, Agent, or Firm—Lowe, Price, LeBlanc & Becker

[57] ABSTRACT

A color printing display device designed to enable an operator to easily check a printing color manually selected is used for a printer which selectively uses any one of or a set of a plurality of color bands constituting an ink ribbon to print in a desired printing color. It is comprised of the same number of printing color selecting keys (24a through 24d) and of light emitting diodes (26a through 26d) as the number of the color bands, and a computer (11) which operates in response to key operation. When the first key (24a) is held depressed for a specific time, the first diode (26a) blinks to show that a selected printing color can be displayed. If the first key is depressed again, then one or two diodes, which correspond to the currently selected printing color, light. Each time the first key is depressed to change the printing color, one or two diodes, which correspond to a new printing color available for resetting, light. If a key (24b through 24d) other than the first key is depressed, data which indicates a printing color that the operator has conclusively selected and that the operator intended is sent to the ribbon shifting mechanism (19). In accordance with the data received, the ribbon shifting mechanism is actuated to print in the required printing color which corresponds to the required color band.

10 Claims, 6 Drawing Sheets

PRINTING COLOR DISPLAY DEVICE FOR A PRINTER

TECHNICAL FIELD

The present invention relates to a printer designed to print in any one of various printing colors, and more particularly, to a device mounted on such a printer to display a printing color which has been manually selected by an operator.

BACKGROUND ART

A printer is known which is comprised of an ink ribbon consisting of a plurality of color bands, a means to manually select a printing color, and a ribbon shifting means for moving the ink ribbon to a height where a color band corresponding to a color which has been selected manually faces a printing head and for retaining it at that height, thus printing in the selected printing color. In this type of printer, it is also widely known that any two color bands are used for superimposition-printing to print in a color other than the one which corresponds to a single color band.

In such a printer, however, it is difficult for an operator to check which printing color has been selected through a selecting means. For this reason, the operator checks a selected color by having the printer actually print it out.

DISCLOSURE OF THE INVENTION

An object of the present invention is to provide a printing color display device for a printer, which is designed to enable an operator to easily check, without printing, a printing color which has been manually selected.

Another object of the present invention is to provide a printing color display device which permits accurate and easy manual selection of an intended printing color when a selected printing color is found different from what was intended.

Still another object of the present invention is to provide a printing color display device which is capable of preventing printing in a wrong color caused by erroneous operation by an operator.

To fulfill the aforementioned objects, according to the present invention, a printing color display device is provided, which is used for a printer designed to print in a desired printing color by using any one of a plurality of color bands making up an ink ribbon or a combination of any two different color bands. The printing color display device is comprised of a printing color selecting means which is manually operated by an operator, a controlling means which operates in response to manual operation of the printing color selecting means by the operator, and a printing color displaying means which is actuated under the control of the controlling means. The controlling means operates the printing color displaying means so that it displays a printing color which is manually selected by the operator through the printing color selecting means.

Preferably, the printing color selecting means includes a plurality of printing color selectors which are independently operated by the operator by hand. More preferably, the printing color selectors correspond to their respective color bands of the ink ribbon. The printing color displaying means includes a plurality of printing color displays, and preferably, the printing color displays correspond to their respective printing color selectors, and more preferably, correspond to their respective color bands of the ink ribbon. The controlling means controls the operation of the printing color displaying means so that at least one printing color display which corresponds to a printing color selector for a single color or a printing color selector for a combination of any two different colors, which is manually operated by the operator, performs displaying operation.

Preferably, the controlling means controls the operation of the printing color displaying means so that a printing color which is different from an already selected printing color is displayed each time the printing color selecting means is operated with the already selected printing color displayed.

Preferably, the controlling means allows the printing color displaying means to display a printing color only when the manual operation of the printing color selecting means by the operator continues for a specific time.

As described above, according to the present invention, a printing color which has been manually selected through the printing color selecting means is displayed by the printing color displaying means under the control of the controlling means. This enables an operator to easily check a printing color, which has manually been selected, without actually printing it by a printer, thus making it possible to quickly and properly specify a desired printing color.

Preferably, printing color selectors and printing color displays which correspond to their respective color bands of the ink ribbon, so that at least one printing color display which corresponds to any one printing color selector or a set of printing color selectors which are manually operated by the operator performs displaying operation. Therefore, the operator can accurately and easily select a desired printing color by hand, and also accurately and easily check the printing color which has manually been selected.

Also, a series of printing colors which are different from already selected printing colors is displayed one color after another, so that if an already selected color is found different from the intended color, then the operator can accurately and easily select the intended color by hand.

Further, the printing color displaying means is allowed to operate only when the manual operation of the printing color selecting means by the operator continues for a certain time, so that erroneous printing color display caused by operator's improper operation can be prevented.

BEST MODE OF CARRYING OUT OF THE INVENTION

Figure 1:
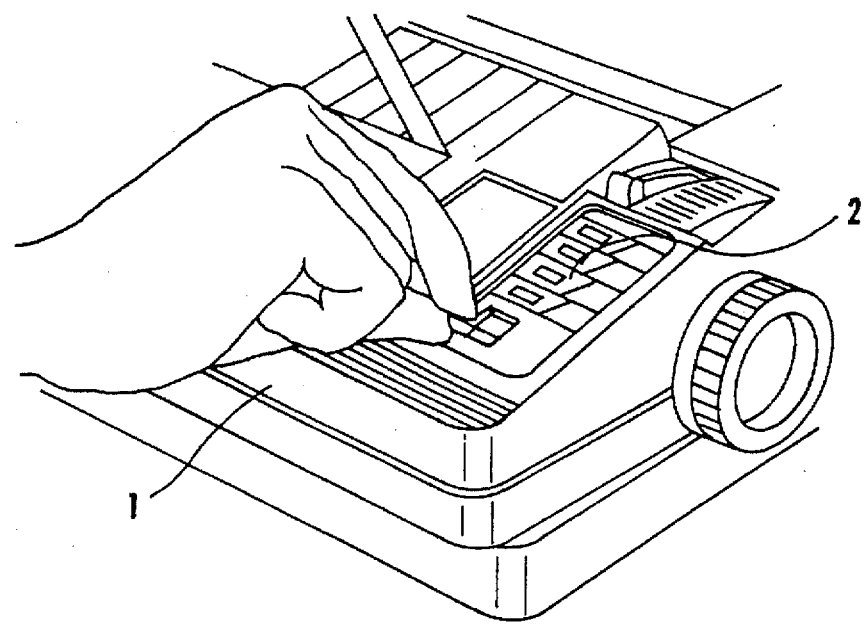
FIG. 1 is a perspective partial schematic illustration of a printer on which an embodiment of a printing color display device according to the present invention is installed.

A printer, on which a color printing display device according to the present invention is mounted, is designed to perform various functions, including the functions of the color printing display device, under the control of a main computer incorporated in the printer. For that purpose, as illustrated in FIG. 1, the printer is provided with a control panel 2 mounted on the top surface of a casing 1, so that an operator can operate the panel 2 to select a required function.

Figure 2:
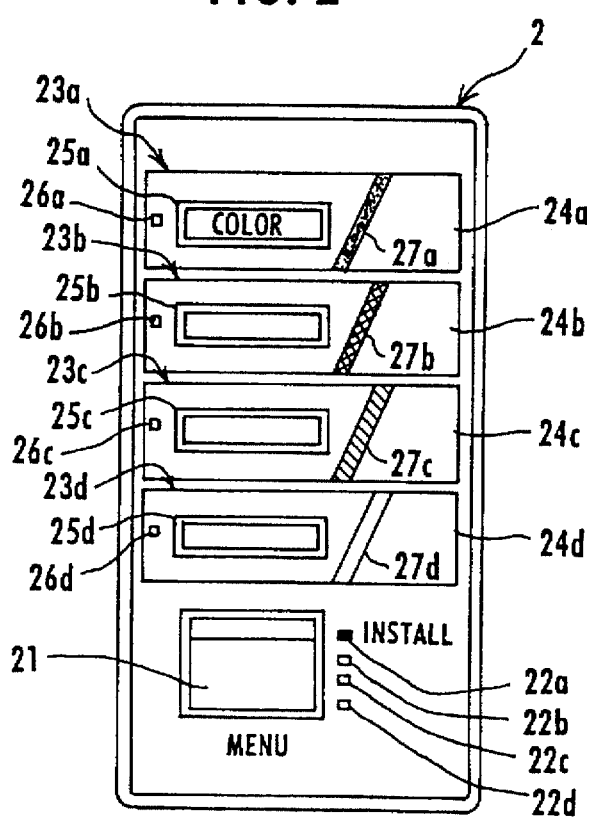
FIG. 2 is a block diagram which shows a controller and its peripheral elements of the printing color display device.

More specifically, as shown in FIG. 2, the control panel 2 is provided with a slide switch 21 which can be set at sliding intervals of Nos. 1 through 4. When an operator manually sets the switch 21 at one of the sliding positions No. 1 through No. 4, its corresponding function menu out of printer function menus No. 1 through No. 4 is selected. On the right to the slide switch 21, marks 22a through 22d of No. 1 through No. 4 are provided, each of which showing the type of the function menus No. 1 through No. 4. Also, the panel 2 is provided with input control units 23a through 23d of No. 1 through No. 4, and each unit includes a corresponding multi-function key of 24a through 24d of No. 1 through No. 4 to which an input function depending on a function menu of No. 1 through No. 4 is assigned when the key is depressed, and also includes a corresponding function display of 25a through 25d of No. 1 through No. 4 for displaying a function which is presently assigned by the multi-function key.

Figure 3:
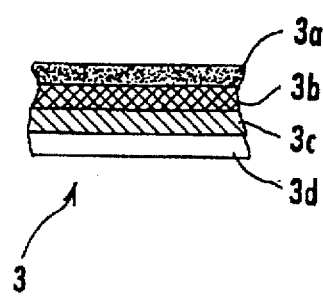
FIG. 3 is a view showing the displays and manual selectors of the printing color display device mounted on a control panel of the printer.

The printer is provided with an ink ribbon 3 (FIG. 3) which is arranged so that it can freely move up or down between a printing head and a platen of a printing unit 18 (FIG. 4) and which consists of a plurality of color bands, and a widely known conventional ribbon shifting mechanism 19 (FIG. 4) for vertically moving the ink ribbon to make a desired color band face the printing head and for retaining the ink ribbon in that position, thus printing in the desired printing color that corresponds to said color band. The ribbon shifting mechanism 19 is designed to refer to control data which indicates a printing color specifying variable value C (to be discussed later) received from the main computer and to shift the ink ribbon 3 in accordance with the variable value C. Further, the printer is designed so that it is capable of performing, as necessary, "superimposition-printing" wherein after printing is made in a printing color, another printing color is printed over that print in the same printing position by using a combination of any two color bands. If a sub-computer (not illustrated) for controlling the operation of the printing unit 16, the ribbon shifting mechanism 19, etc. under the control of the main computer is provided in the printer, then the variable value C is sent to the sub-computer.

The ink ribbon 3 consists of No. 1 through No. 4 color bands 3a through 3d which are, for instance, vertically adjacent to each other and also made into one piece, the colors (corresponding to variables C=0, 2, 1 and 4) of the color bands 3a through 3d being black, cyan, magenta and yellow, respectively. Superimposition-printing (variable C=3) which uses the No. 2 and No. 3 color bands 3b and 3c produces a violet printing color. Superimposition-printing (variable C=5) which uses the No. 3 and No. 4 color bands 3c and 3d produces an orange printing color. Superimposition-printing (variable C=6) which uses the No. 2 and No. 4 color bands produces a green printing color. In other words, printing can be performed in any one of the seven printing colors.

The color printing display device is now described according to an embodiment of the present invention.

Figure 4:
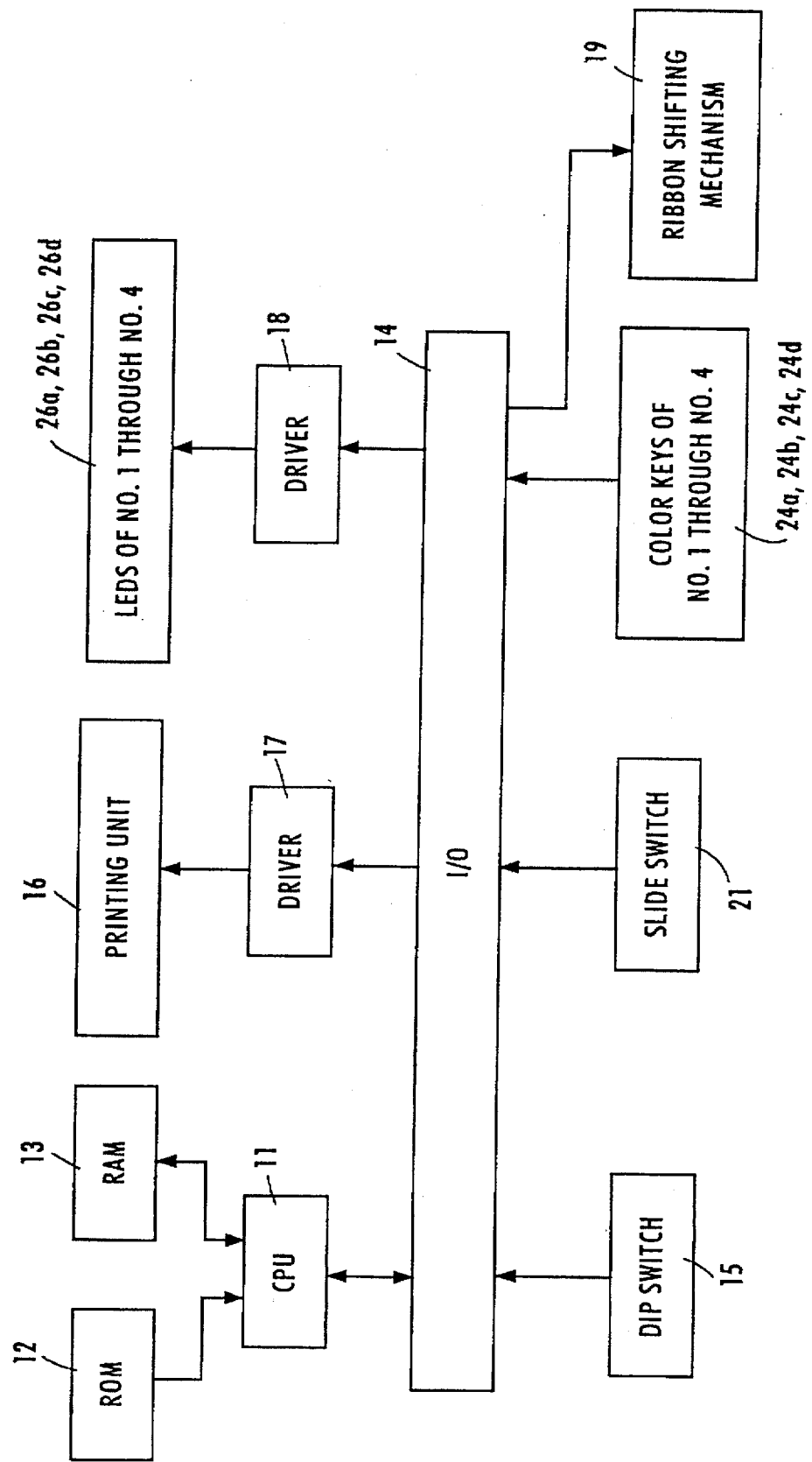
FIG. 4 is a partially enlarged view of an ink ribbon mounted on the printer.

Referring to FIG. 4, the color printing display device is provided with a central processing unit (CPU) 11 as a controlling means, a read-only memory (ROM) 12, a random access memory (RAM) 13 and an input/output circuit 14. Elements 11 through 14 constitute a part of the color printing display device and also constitute the aforementioned main computer to fulfill various printer functions. A control program and the like for executing the various printer functions are stored in the ROM 12 in advance, and the RAM 13 is designed to temporarily store a result of arithmetic operation and the like by the CPU 11. The printing color specifying variable C and flags F1 through F3 to be used as control data in the color processing task (FIG. 5) to be discussed later are stored in the RAM 13 or a register built in the CPU 11.

The color printing display device is further provided with four printing color selectors which correspond to their respective color bands of No. 1 through No. 4, 3a through 3d of the ink ribbon and which are manually operated by an operator, and with four printing color displays which correspond to their respective color bands 3a through 3d. In this embodiment, the printing color selectors consist of No. 1 through No. 4 multi-function keys 24a through 24d. More specifically, it is designed so that the multi-function keys 24a through 24d serve as the No. 1 through No. 4 printing color selecting keys (hereinafter referred to as color keys) when the slide switch 21 corresponds to the first mark 22a, and when the first function menu (set function menu) is selected by setting the switch in the first slide position shown in FIG. 2. The printing color display unit of the present embodiment consists of No. 1 through No. 4 light emitting diodes (LEDs) 26a through 26d which are located on the left to the No. 1 through No. 4 function displays 25a through 25d on the control panel 2.

Further, the functions displays 25a through 25d and their corresponding multi-function keys 24a through 24d on the panel 2 are provided with No. 1 through No. 4 slash marks 27a through 27d, each of which has the same color as that of its corresponding color band in order to indicate that the No. 1 through No. 4 multi-function keys 24a through 24d correspond to their respective No. 1 through No. 4 color bands 3a through 3d and the No. 1 through No. 4 LEDs 26a through 26d correspond to their respective color bands 3a through 3d. The colors of the No. 1 through No. 4 slashes 27a through 27d are black, cyan, magenta and yellow.

As shown in FIG. 4, a DIP switch 15 for initializing the operation mode of the printer, the ribbon shifting mechanism 19, the slide switch 21 and color keys 24a through 24d are connected to the input/output circuit 14. The printing unit 16 and the LEDs 26a through 26d are also connected to the input/output circuit 14 via drivers 17 and 18.

The operation of the color printing display device is now described with reference to FIG. 5 through FIG. 8.

An operator initializes the operation mode of the printer for a color ribbon mode by the DIP switch 15, and installs the ink ribbon 3 and printing paper on the printer, then turns the power of the printer ON. When the power is turned ON, the CPU 11 of the color printing display device performs initializing operations such as resetting the printing color specifying variable C and the flags F1, F2 and F3 to be discussed later to a value "0." Then, the operator sets the slide switch 21 in the first slide position.

Figure 5:
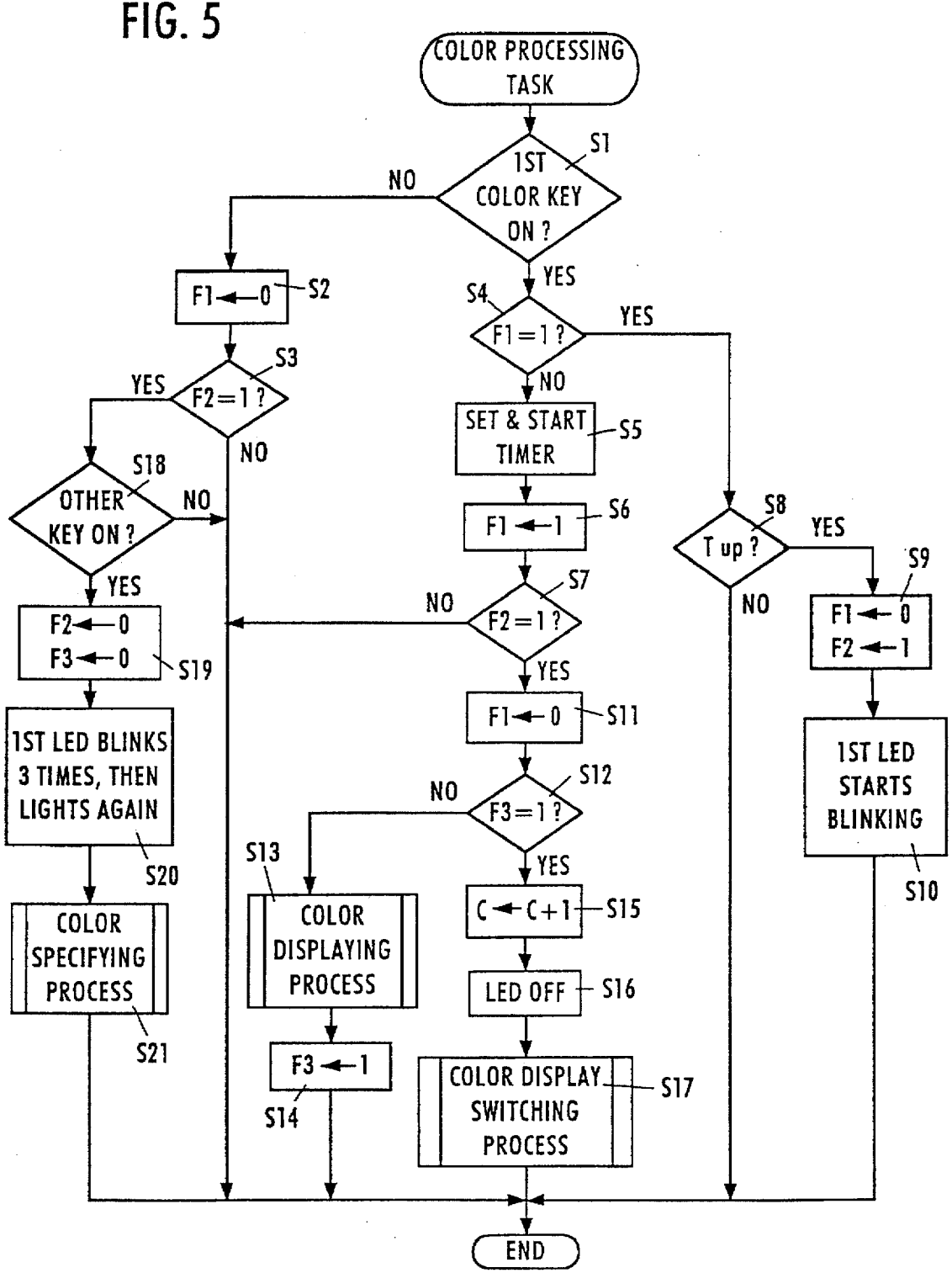
FIG. 5 is a flowchart which shows a color processing task executed by the printing color display device.

In response to the manual setting of the slide switch 21 in the first slide position, the CPU 11 begins the color processing task of FIG. 5. The color processing task is repeatedly implemented at certain task intervals. The color processing task comprises a color displaying process (FIG. 6) for lighting one or two of the No. 1 through No. 4 LEDs 26a through 26d which correspond to a printing color or colors selected out of the seven printing colors to indicate the printing color or colors that have been selected by the operator a color display switching process (FIG. 7) for cyclical indication of printing colors which are different from the selected color or colors and which are therefore available for resetting, and a color specifying process (FIG. 8) wherein control data which indicates the printing color specifying variable C corresponding to the selected printing color is sent to the ribbon shifting mechanism 19. The color processing task further includes a fool-proof processing for preventing the color displaying process and the color display switching process from being implemented by mistake due to erroneous operation of the first color key 24a.

In each task cycle, the CPU 11 first determines whether the first color key 24a has been manually operated or not (step S1). If the key 24a has not been operated, then the CPU 11 resets the first flag F1 to "0" which indicates that the program is not executing the fool-proof processing (step S2). Since the flag F1 has already been reset by the initialization at the time of turning the power ON, no actual resetting is carried out. The CPU 11 then determines whether or not the second flag F2 is set for "1" which denotes permission for executing the color displaying process and the color display switching process (step S3). Since the flag F2 is reset to "0" at the time of initialization, the result of Judgment in the step S3 immediately after the color processing task is started is "No", and therefore the color processing task for the present cycle is terminated.

After that, when the operator depresses the first color key 24a, causing the key 24a to issue a display command, the CPU 11 recognizes the key operation in the step S1 in the task cycle immediately following the key operation, then judges whether the first flag F1 is set to "1" or not (step S4). In this case, the judgment result is "No", and therefore the CPU 11 sets the timer for the fool-proof processing to a specific time T (e.g. 3 seconds) and starts the timer (step S5), sets the first flag F1 to "1" which denotes that the fool-proof processing is being executed (step S6), and determines whether the second flag F2 is set to "1" or not (step S7). Since the flag F2 still retains the reset value "0," the program terminates the color processing task in this cycle.

If the CPU 11 determines that the key 24a is still held depressed in the step S1 in the following cycle, then it decides whether the specific time T is up or not in the step S8 following the step S4. If the judgment result is "No", then the program terminates the color processing task in that cycle. If the key operation is continued for the specific time T, then the CPU 11 judges that the timer reached the preset time in the step S8 in the immediately following cycle, and resets the first flag F1 to "0" which indicates the end of the fool-proof processing. The CPU 11 also sets the second flag F2 to "1" which indicates the permission for implementing the color displaying process and the color display switching process (step S9), and causes the first LED 26a to start blinking, thus giving the operator a visible indication to show that the color displaying process is enabled (step S10).

On the contrary, if the depression on the first color key 24a is released before the specific time T is up, then the CPU 11 recognizes the release of the key in the step S1 in the cycle immediately after the release of the key. The CPU 11 then resets the first flag F1 in the step S2, and goes back to the standby state. Accordingly, the color displaying process or the color display switching process is not implemented by mistake from erroneous operation of the color key 24a.

During the step S1 in the cycle immediately after the depression on the first color key 24a for the specific time T (end of the fool-proof processing), the program decides whether the color key 24a is manually operated or not. If the key is not operated, then the program resets the first flag F1 (step S2). The flag F1 was already reset to in the step S9 of the previous cycle, therefore, no actual resetting is implemented. During the next step S3, the program determines that the second flag F2 is set to "1," and further during the next step S18, the program determines whether or not one of the second through fourth color keys 24b through 24d other than the first color key 24a has been manually operated. After the color displaying process and the color display switching process are enabled, the color keys except the first color key function to forcibly terminate both processes. Normally, therefore, color display cannot be switched even if the second through the fourth color keys 24b through 24d are operated by the operator.

When the operator manually operates the first color key 24a to check the printing color currently selected in response to the blinking of the first LED 26a, the CPU 11 recognizes the key operation during the step S1 in the immediately following cycle, and executes the processing of the step S4 and after. If the color key 24a is operated while the LED 26a is blinking, then the LED 26a stops blinking (not illustrated). The first flag F1 was already reset when the end of the fool-proof processing was detected, and the judgment result in the step S4 in the cycle immediately following the key operation is "No". Accordingly, the CPU 11 restarts the full-proof processing timer, sets the first flag F1 to "1" (steps S5 and S6), then determines whether the second flag F2 is set to "1" or not (step S7). The flag F2 was already set when the end of the fool-proof processing was recognized, and therefore, the judgment result in the step S7 is "Yes". In this case, the fool-proof processing is not necessary, therefore, the CPU 11 resets the first flag F1 (step S11), then decides whether or not the third flag F3 is set to "1" which denotes that the color display switching process is being implemented (step S12). Since the flag F3 was reset at the time of the initialization when the power was turned ON, the judgment result in the step S12 is "No", and the color displaying process (step S13) for displaying the printing color currently selected is begun.

Figure 6:
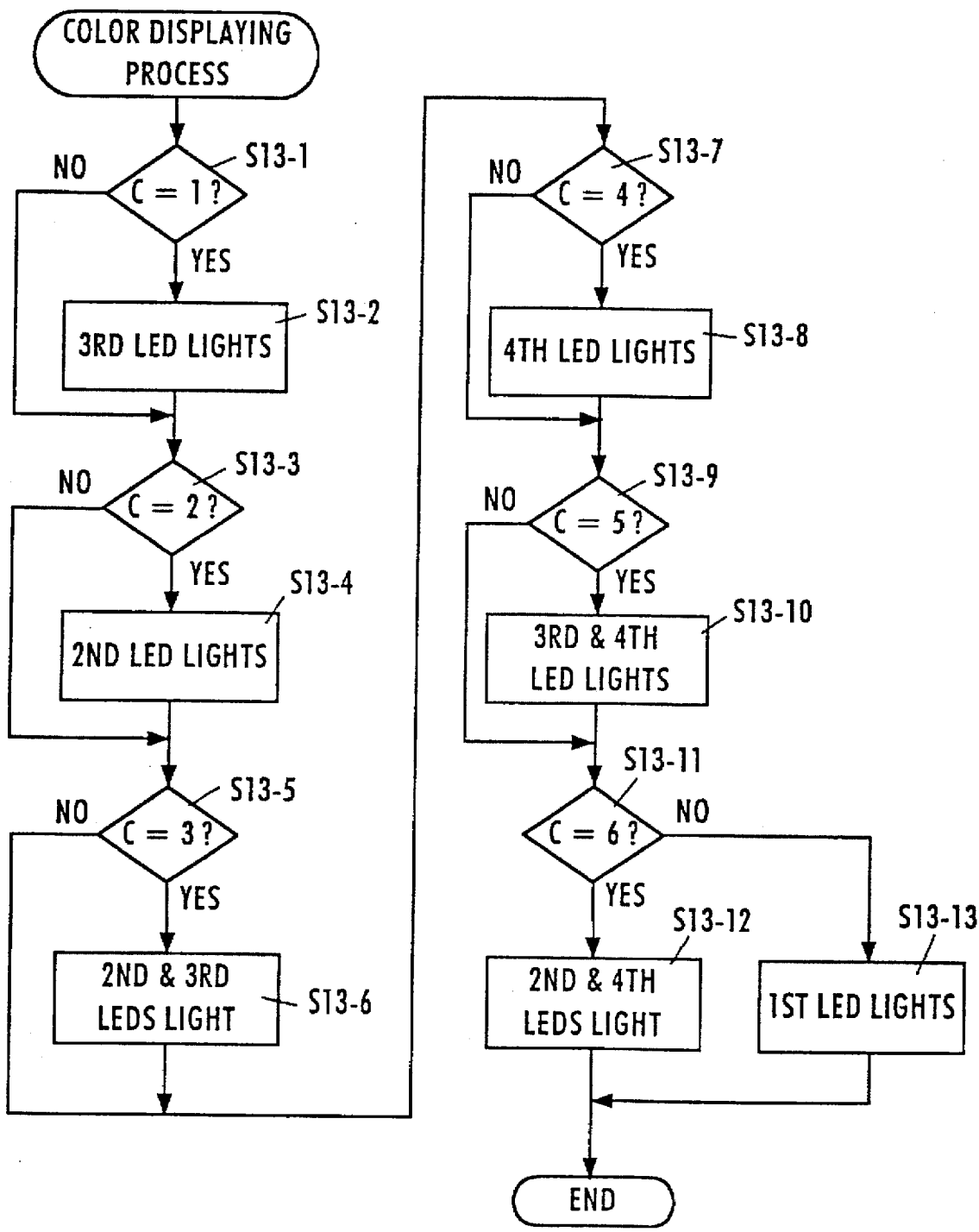
FIG. 6 is a flowchart which shows a color displaying process shown in FIG. 5.
Figure 7:
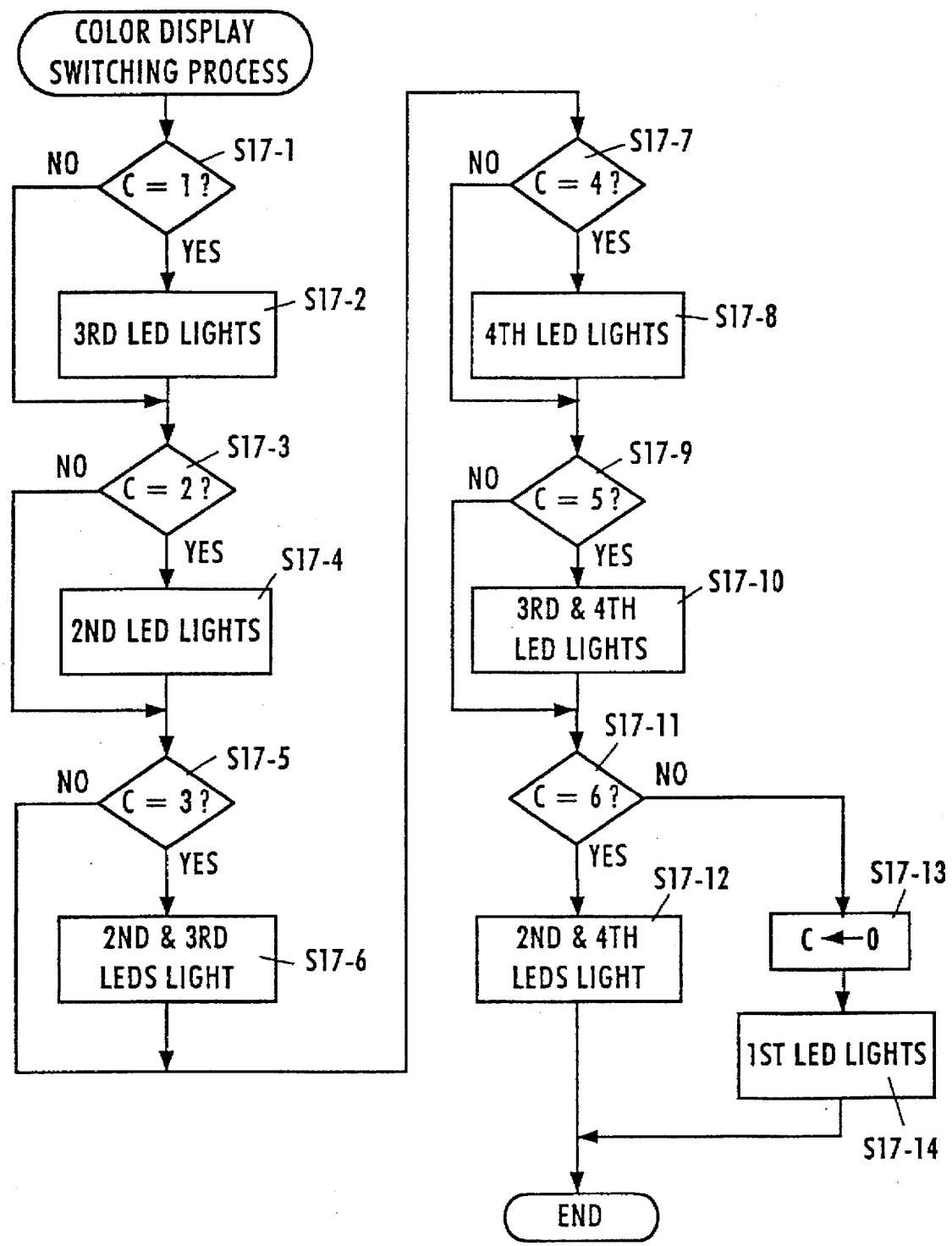
FIG. 7 is a flowchart which shows a color display switching process shown in FIG. 5.

As shown in detail in FIG. 6, during the color displaying process step, the CPU 11 refers to the value of the printing color specifying variable C stored, for instance, in the RAM 13 to decide which of "1" through "6" is the variable value C (step S13-1, S13-3, S13-5, S13-7, S13-9 and S18-11). Since the value of the variable C was reset to "0" when the power was turned ON, the judgment results of all the steps mentioned above are "No.". Thus, the CPU 11 decides that the present variable value C is "0," and sends a control output to the driver 18 to cause the first LED 26a to light (step S13-13). This provides a visual indication that the black printing color which corresponds to the first color ribbon 3a is currently selected.

If a printing color which is different from the black printing color was already selected when the power was turned ON, or if the printer is designed so that the variable value C is not reset at the time of turning the power ON, then the variable C takes a value other than "0." In this case, if the current variable value C is "1," then the third LED 26c, which indicates that the printing color is magenta, lights (step S13-2). If the value C is "2," then the second LED 26c, which denotes cyan, lights (step S13-4), and if the value C is "3," then the second and third LEDs, which indicate violet, light at the same time (step S13-6). If the value C is "4," then the fourth LED 26d which denotes yellow (step S13-8) lights, and if the value C is "5," then the third and fourth LEDs, which denote orange, light at the same time (step S13-10), and if the value C is "6," then the second and fourth LEDs, which denote green, light at the same time (step S13-12).

After displaying a printing color currently selected, the CPU 11 sets the third flag F3 to "1" which indicates the permission for the color display switching process (step S14), and goes into the standby state. As long as the standby state continues, one or two diodes which indicate the currently selected printing color, for instance, the first LED 26a which denotes black, stays ON.

The operator depresses one of the color keys other than the first color key 24a if the currently selected printing color is the intended color. The reaction of the color printing display device in that case will be discussed later.

If the currently selected printing color is not the color that the operator intended, then the operator depresses the first color key 24a to change the selected printing color. The CPU 11 detects the depression of the key during the step S1 in the cycle immediately following the key operation, and judges whether the value of the third flag F3 is set to "1" or not in the step S12 via the aforementioned step S4 and the like. The flag F3 was set when the aforementioned color displaying process was terminated; therefore, the judgment result obtained in the step S12 is "Yes". Thus, the CPU 11 increments the current value of the printing color specifying variable C by "1" (step S16), and carries out the color display switching process (step S17) which is shown in detail in FIG. 7.

As in the case of the color displaying process (step S13), the CPU 11 decides which of "1" through "6" is the updated printing color specifying variable value C (step S17-1, S17-3, S17-5, S17-7, S17-9 and S17-11) during the color display switching process, then causes the corresponding one or two LEDs out of the LEDs No. through No. 4, 26a through 26d, to light in accordance with the judgment result obtained in the above-mentioned step, thereby giving visual indication of the printing colors currently available for resetting (step S17-2, S17-4, S17-6, S17-8, S17-10, 817-12 and S17-14). If the CPU 11 judges that the updated variable value C is none of "1" through "6" and therefore concludes that the updated value C exceeds "6," then the CPU 11 sets the variable value C to "0" (step S17-13).

After the display of the printing colors available for resetting is terminated, the CPU 11 goes into the standby state. As long as the standby state continues, one or two diodes which show the printing color or colors currently available for resetting stay ON. The operator depresses the first color key 24a if the printing color currently available for resetting is not the intended color. Each time the key is depressed, the aforementioned color display switching process is carried out (step S17), and one or two LEDs which show a new color available for resetting light. Thus, the printing colors available for resetting are cyclically shown.

If the original color or the updated printing color available for resetting is the intended printing color, then the operator depresses a color key other than the first color key 24a. When the CPU 11 recognizes the depression of the color key in the step S18 in the cycle immediately following the key operation, the CPU 11 resets the second flag F2 to "0" which shows that the color displaying process and the color display switching process have been terminated, and also resets the third flag F3 to "0" which indicates that the color display switching process has been terminated (step S19). Then, the CPU 11 causes the first LED 26a to blink for a specific number of times (e.g. 3 times) to notify to the operator that the color displaying process and the color display switching process have been completed (step S20), and begins the color specifying process (step S21).

Figure 8:
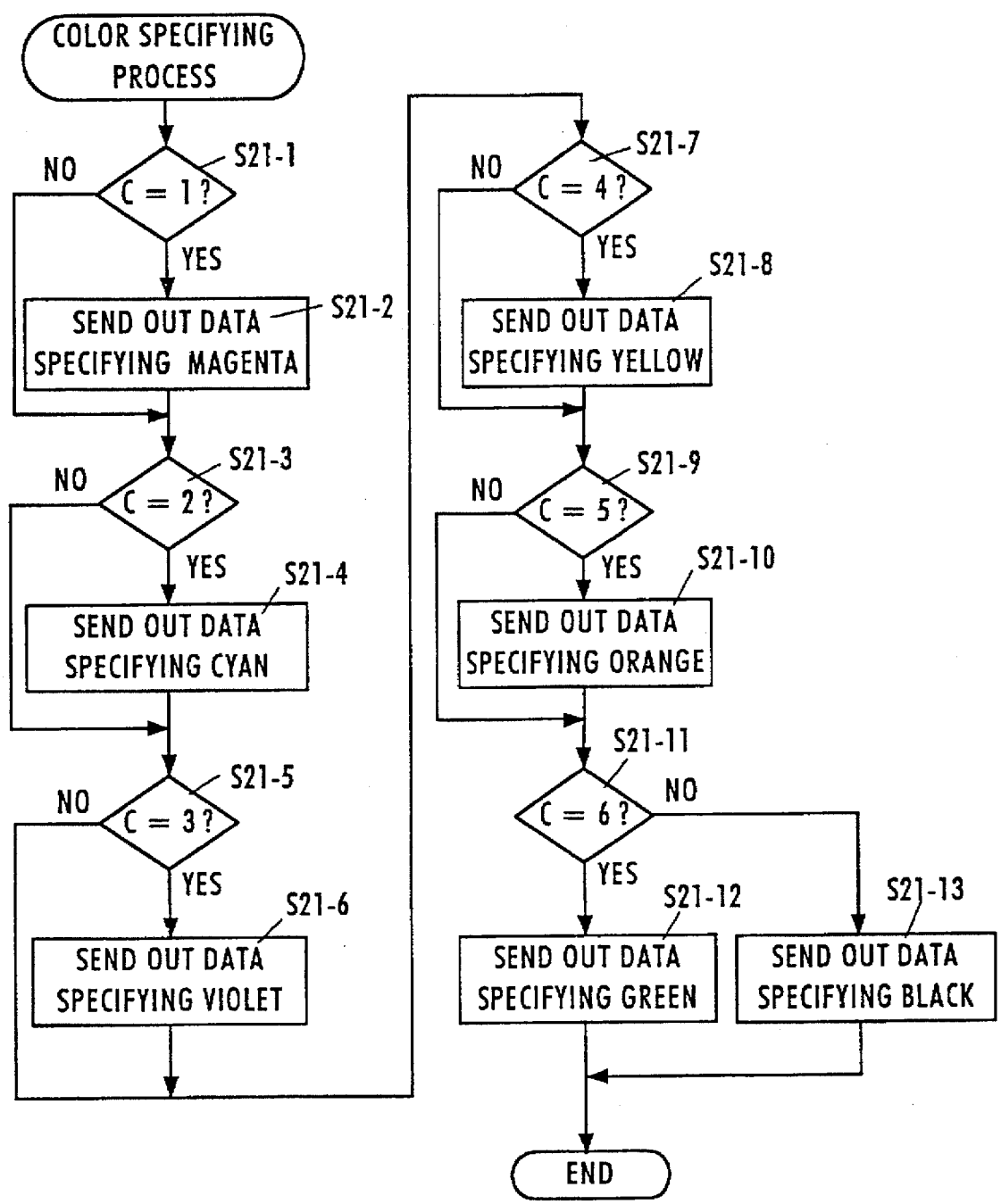
FIG. 8 is a flowchart which shows a color command process shown in FIG. 5.

As shown in FIG. 8 in detail, during the color specifying process, the CPU 11 decides which of "1" through "6" is the printing color specifying variable value C which was indicated last as the printing color for resetting during the above-mentioned color display switching process and which was conclusively selected by the operator (step S21-1, S21-3, S21-5, S21-7, S21-9 and S21-11), then sends the control data, which indicates the variable value C found in the above-mentioned step, to the ribbon shifting mechanism 19 (step S21-2, S21-4, S21-6, S21-8, S21-10, S21-12 and S21-13). This completes the color processing task.

At the beginning of printing operation, the ribbon shifting mechanism 19 refers to the printing color specifying data which is sent from the CPU 11 in the aforementioned color specifying process and which corresponds to the variable value C, and shifts the ink ribbon 3 in accordance with the data. As a result, the ink ribbon is vertically moved and retained so that the required color band of the ink ribbon 3 faces the printing head. After that, printing is performed through the desired color ribbon in the desired printing color which corresponds to that color ribbon. If a combination of two desired color ribbons is specified by the printing color specifying data, then superimposition-printing is performed in the printing color which corresponds to the set of color ribbons.

The present invention is not limited to the embodiment described above, but it may be implemented in various other forms.

For instance, in the embodiment, the number of the printing color selecting keys provided and the number of the light emitting diodes provided are the same as that of the color zones of the ink ribbon. However, the number of the printing color selecting keys provided and that of the light emitting diodes provided may be the total number of printing colors which are produced by using color ribbons independently or in combination.

I claim:

1. A color printing display device used for a printer which prints in a desired printing color from a plurality of colors by selectively using one of a plurality of color bands constituting an ink ribbon or a combination of any two of the color bands, the color printing display device comprising:

printing color selecting means to be operated manually by an operator for selecting a printing color, controlling means coupled to said printing color selecting means for receiving an operator's manual selection of printing color, and printing color display means responsive to said controlling means for continuously displaying the printing color selected by the operator to allow the operator to view the display and check the printing color at any time.

2. The printing color display device according to claim 1, wherein said printing color selecting means comprises:
    a plurality of printing color selectors for manual operation by an operator, and said printing color display means comprises:
    a plurality of printing color displays, wherein said controlling means controls operation of said printing color display means to activate at least one printing color display corresponding to either a printing color selector or a set of printing color selectors manually selected by an operator.

3. The color printing display device according to claim 2, wherein each of said printing color displays corresponds to a respective one of said printing color selectors.

4. The color printing display device according to claim 2, wherein each of said printing color selectors corresponds to a respective one of said color bands of said ink ribbon, and each of said printing color displays corresponds to a respective one of said color bands of said ink ribbon.

5. The color printing display device according to claim 2, wherein each of said printing color selectors issues a display command when depressed an operator, and said controlling means operates in response to said display command.

6. The color printing display device according to claim 2, wherein each of said printing color displays comprises an indicator.

7. The color printing display device according to claim 1, wherein said controlling means controls said printing color display means to display a printing color only when said printing color selecting means is actuated by an operator for at least a predetermined time.

8. The color printing display device according to claim 1, wherein said controlling means controls said printing color display means to display a printing color different from the printing color when said printing color selecting means is operated.

9. The color printing display device according to claim 1, wherein said manually operable printing color selecting means comprises a plurality of switching means each corresponding to one of said plurality of colors.

10. The color printing display device according to claim 9, wherein said printing color display means comprises one or more LEDs corresponding to each of said switching means.

* * * * *